(12) United States Patent
Barthel et al.

(10) Patent No.: US 9,115,837 B2
(45) Date of Patent: Aug. 25, 2015

(54) QUICK CONNECTOR COUPLING

(71) Applicant: TI Automotive (Fuldabrück) GmbH, Fuldabrück (DE)

(72) Inventors: Iris Barthel, Schauenberg (DE); Alexander Bol, Guntershausen (DE); Kay Bube, Schenklengsfeld (DE); Hans Jensen, Dettingen unter Teck (DE); Rick Pepe, Macomb, MI (US)

( * ) Notice: Subject to any disclaimer, the term of this patent is extended or adjusted under 35 U.S.C. 154(b) by 0 days.

(21) Appl. No.: 14/071,186

(22) Filed: Nov. 4, 2013

(65) Prior Publication Data
US 2014/0125051 A1    May 8, 2014

Related U.S. Application Data

(60) Provisional application No. 61/722,665, filed on Nov. 5, 2012.

(51) Int. Cl.
| F16L 39/00 | (2006.01) |
| F16L 37/252 | (2006.01) |
| F16L 37/084 | (2006.01) |

(52) U.S. Cl.
CPC .............. *F16L 37/252* (2013.01); *F16L 37/084* (2013.01)

(58) Field of Classification Search
USPC ................... 285/319, 33, 307, 305, 308, 309
See application file for complete search history.

(56) References Cited

U.S. PATENT DOCUMENTS

| 2,476,172 | A | * | 7/1949 | Williams ...................... 285/280 |
| 4,599,171 | A | * | 7/1986 | Padilla et al. ............... 210/257.2 |
| 5,161,834 | A | * | 11/1992 | Norkey ......................... 285/319 |
| 5,211,427 | A | | 5/1993 | Washizu |
| 5,568,946 | A | | 10/1996 | Jackowski |
| 5,607,190 | A | * | 3/1997 | Exandier et al. ................ 285/93 |
| 5,704,658 | A | | 1/1998 | Tozaki et al. |
| 5,873,610 | A | | 2/1999 | Szabo |
| 6,155,612 | A | | 12/2000 | Szabo |
| 6,199,919 | B1 | | 3/2001 | Kawasaki et al. |
| 6,260,889 | B1 | | 7/2001 | Tozaki et al. |
| 6,318,764 | B1 | * | 11/2001 | Trede et al. ................... 285/305 |
| 6,428,055 | B1 | * | 8/2002 | Moretti et al. ................ 285/319 |
| 6,481,759 | B1 | | 11/2002 | Kawasaki et al. |
| RE38,204 | E | | 7/2003 | Kazarian |
| 6,629,707 | B1 | * | 10/2003 | Yamaguchi et al. .......... 285/319 |
| 6,910,719 | B1 | * | 6/2005 | Zeleny et al. ................. 285/308 |
| RE38,786 | E | * | 8/2005 | Guest .............................. 285/24 |
| 7,029,036 | B2 | | 4/2006 | Andre |
| 7,434,846 | B2 | | 10/2008 | Baumgartner |

(Continued)

FOREIGN PATENT DOCUMENTS

JP        H07260073 A       10/1995

*Primary Examiner* — Aaron Dunwoody
(74) *Attorney, Agent, or Firm* — Leydig, Voit & Mayer, Ltd.

(57) ABSTRACT

Quick connector coupling having a connector body to receive a male member with a radial upset comprised of two separate, interconnected components, a head element and a sealing element which define a through-hole from a male member entry port at the end of the head element axially to an exit port at the end of the sealing element. A retainer for releasably securing the male member to the connector body is ring-shaped, and encircles the connector body head element. It includes at least one retainer element, which reaches through a window in the head element and interacts with the radial upset of the male member to secure the male member in the connector body.

19 Claims, 4 Drawing Sheets

(56) References Cited

U.S. PATENT DOCUMENTS

| | | | |
|---|---|---|---|
| 7,878,552 B2* | 2/2011 | Freter | 285/308 |
| 8,181,997 B2* | 5/2012 | Wang | 285/314 |
| 8,205,912 B2* | 6/2012 | Takenaka et al. | 285/81 |
| 8,366,154 B2* | 2/2013 | Wang | 285/314 |
| 8,696,037 B2* | 4/2014 | Nakamura | 285/315 |
| 8,746,749 B2* | 6/2014 | Hama et al. | 285/307 |
| 2001/0043833 A1 | 11/2001 | Bahner et al. | |
| 2002/0158465 A1* | 10/2002 | Tsurumi | 285/93 |
| 2003/0178844 A1* | 9/2003 | Klinger et al. | 285/319 |
| 2004/0232693 A1* | 11/2004 | Legeay | 285/305 |
| 2007/0040377 A1* | 2/2007 | Moretti et al. | 285/319 |
| 2008/0036205 A1* | 2/2008 | Kojima et al. | 285/319 |
| 2009/0167018 A1* | 7/2009 | Lien | 285/308 |

* cited by examiner

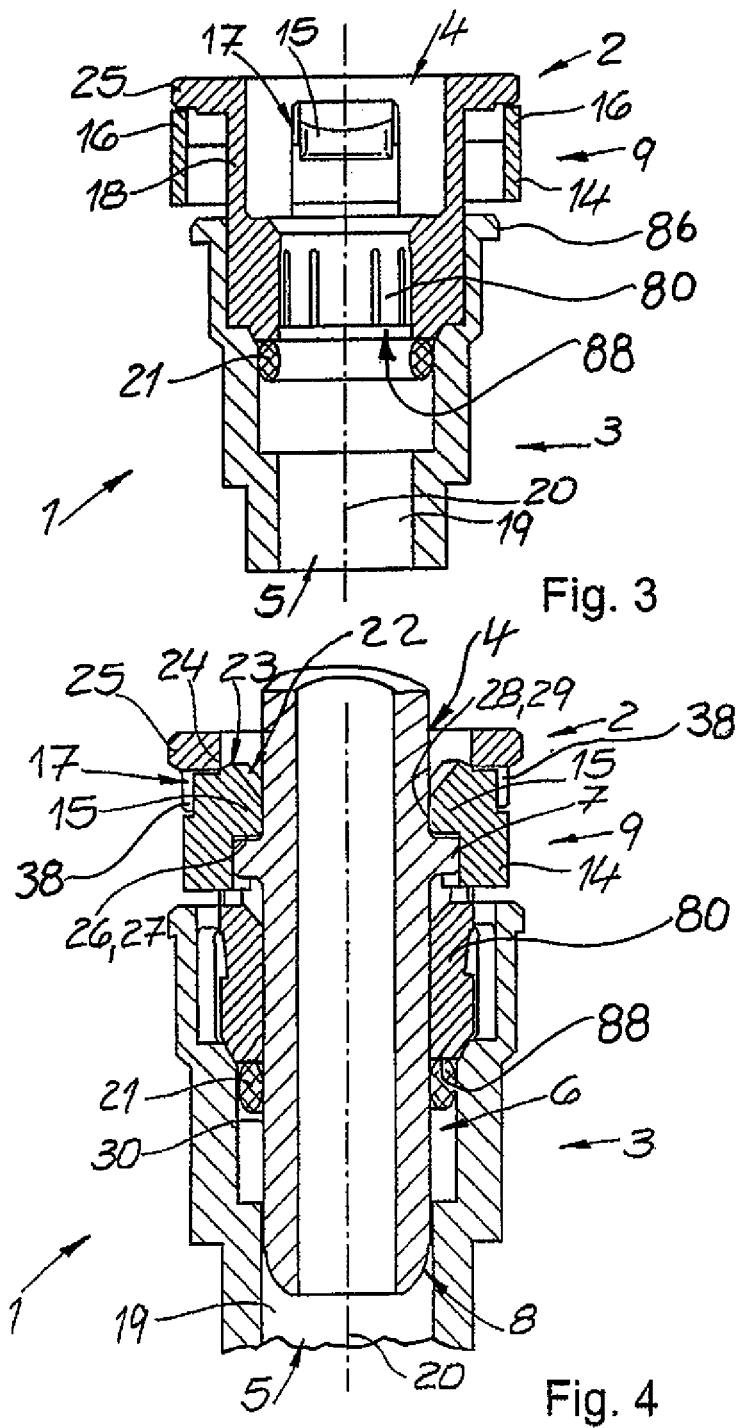

QUICK CONNECTOR COUPLING

CROSS REFERENCE TO RELATED APPLICATIONS

This application claims priority pursuant to Title 35 USC 119(e) to U.S. Provisional Application Ser. No. 61/722,665 filed Nov. 5, 2012, entitled "Quick Connector Coupling," the entire contents of the specification and drawings of which is hereby incorporated by reference herein as if fully set forth.

BACKGROUND

The invention concerns a quick connector coupling for establishing a separable connection in a fluid line.

Quick connector couplings of the aforementioned kind are generally known from actual practice. These quick connector couplings are, for example, utilized in fluid line systems in motor vehicles and must create a reliable connection impermeable to fluids between two lines, lasting for long periods and under variable outer conditions. These quick connector couplings known from practice have the disadvantage that their design is complex; they are difficult to assemble and have a large volume. This makes it difficult, in part, to utilize quick connector couplings known from practice in difficult to access or tight spaces of a motor vehicle.

The invention is therefore faced with the challenge of describing a quick connector coupling, which is characterized by simple assembly, a compact design and high functional safety. According to the invention, the quick connector coupling is utilized in, for example, fluid lines of combustion engines, especially motor vehicles. For example, it is possible to utilize the quick connector coupling in a brake line system, fuel line system and/or urea solution line system.

As a solution of the technical problem, the invention proposes a quick connector coupling for establishing a separable connection in a fluid line, between a hollow connector body, and a hollow male member or tube.

SUMMARY

The connector body is comprised of at least two separate components, namely a head element and a sealing element, wherein a section of the head element is partly inserted into the sealing element when assembled, whereby the connector body defines a through bore, which extends from a male member entry port of the connector body at one end of the head element to an exit port at the axially opposite end of the sealing element. It has proven advantageous that at least the sealing element of the connector coupling is molded from an electrically conductive synthetic material (ESD-plastic). The head element may be formed of non-conductive molded polymeric material. This is considered in important reduction in overall material cost.

The through bore preferably has a round shape and has a longitudinal central axis, which extends from the male member entry port (entry port) at an end of the head element to the exit port at the opposite end of the sealing element. Expediently the exit port is arranged on an end of the sealing element that faces away from the head element. Typically, the portion of the sealing element defining the exit port is configured to form a hose connection or the like to receive an attachment to another component of the fluid system.

The sealing element is a generally hollow cylindrical member defining an insertion receptacle at its end toward the head element. Expediently, the insertion receptacle end of the sealing element includes a radial flange surrounding the insertion receptacle. The head element is a generally hollow cylindrical member defining a insertion portion at is end facing toward the sealing element. When joined the head element and sealing element form the connector body with internal through bore.

It is especially preferable that the male member is designed as a pipe with a flow channel, whereby the longitudinal axis of the assembled flow channel preferably aligns with the central axis of the through bore. The cylindrical male member or tube, extends through the male member entry port into the through bore, whereby the male member has a cylindrical sealing surface adjacent its end and a ring-shaped radial upset spaced from the end, whereby the radial upset protrudes beyond the sealing surface,
a retainer on the connector body releasably secures the male member to the connector body,
characterized by the fact that
the retainer is ring-shaped, and encircles the connector body, preferably the head element, and includes at least one locking lug, which locking lug reaches through a window in the connector body, assigned to locking lug, whereby the locking lug, in assembled condition, interacts with the radial upset of the male member, to secure the male member in the through bore in the connector body. It is contemplated that the retainer preferably includes two diametrically opposed locking lugs and the connector body includes two windows disposed diametrically opposed to receive the locking lugs.

Preferably, the retainer is an oval-shaped ring configured to have a diameter on its minor axis slightly larger than the diameter of the head element and a diameter on its major axis sufficiently large to permit manual compression of the retainer along the major axis of the oval. It is contemplated that locking lugs be disposed diametrically opposed, at the minor axis of the retainer. In principal, it is possible to form the ring with a quadrangular or square cross-section, whereby the corners of the quadrangle or square are rounded off. In principal, it is possible to make the ring circular.

It is advisable that the retainer includes two and preferably only two locking lugs, whereby each locking lugs is assigned one window in the connector body, through which window the locking lugs reach respectively, when assembled, interact with the radial upset of the male member, so that the male member is secured in the connector body. In accordance with a preferred design, the preferably two locking lugs are arranged facing each other, positioned diametrically opposite each other on the retainer along the minor axis thereof. Apart from the position on the ring or retainer, the locking lugs are expediently identical or generally identical in shape. Preferably the retainer with the locking lugs fastened to the ring or the locking lugs fastened to it are formed in such a way that the locking lugs or the locking lugs are spring-mounted in a radial direction toward the central axis of the through bore. As an advantage, the spring force acts upon the locking lug or the locking lugs, through which spring force the locking lug or the locking lugs is or are pressed towards the central axis of the through bore.

The locking lugs of the retainer preferably include a retention surface expediently arranged traverse to the longitudinal axis of the through bore. It is within the scope of the invention that the retention surface is arranged on an end wall of the locking lugs facing toward the exit port. In accordance with a design, when assembled, the retention surface of the retainer abuts to the radial upset of the male member, especially to a radial annular contact surface nearest the entry port. It is advantageous if the locking lugs have a contact surface that fits the assembled locking lugs to a preferably cylindrical surface of the male member adjacent the upset nearest the entry port. Within the context of the invention, a locking surface describes a section of the cylindrical locking surface of the male member, which, when assembled, extends from the radial upset towards the end of the male member outside of the entry port. It is especially preferable that the contact surface of the locking lugs is formed complementary to the cylindrical surface of the male member. In other words, the contact surface of the retainer surrounds the cylindrical surface of the male member only for a part of the cylindrical girth of the male member.

It has proven effective that the through bore has a sealing section, in which at least one sealing element is accommodated. When the quick connector coupling is assembled, the sealing element impermeable to fluids preferably fits between the cylindrical sealing surface of the male member and the through bore of the sealing element. In accordance with a design, the male member includes an insertion end with a conically shaped or spherical shell section-shaped end wall. In this way, the male member can be easily inserted into the through bore and/or the sealing element, which is preferably formed as an O-ring.

It is recommended that the retainer be disposed surrounding the outside of connector body head element, except for the locking lug or locking lugs penetrating the window or windows of the head element. Preferably the connector body is assembled by initially arranging the retainer on the head element. Expediently the head element is fixated to the sealing element so that the retainer is, in especially preferable manner, permanently attached to the connector body, especially the head element. The condition in which the head element is connected to the sealing element and the retainer is secured on the connector body is described as pre-assembled condition, within the scope of the invention. In pre-assembled condition, the retainer is preferably permanently secured to the connector body but movable between limits in the axial direction in relation to the through bore in relation to the connector body.

Expediently, on an end of the head element that faces away from the sealing element, the head element includes a shroud encircling the male member entry port whereby the retainer is arranged between the shroud of the head element and the flange of the sealing element, for limited axial movement.

The shroud on the end of the head element prevents, in accordance with a design, a pulling off of the retainer from the connector body. Within the scope of the invention, the removal of the retainer from the connector body is neither possible in axial or radial direction relative to the through bore. Expediently the shroud includes a larger cross-section or larger cross-section surface than the head element. Similarly the flange on the insertion receptacle of the sealing element has a larger cross-section than the sealing element.

The head element includes a shroud at the end defining the male member entry port with a protective edge that protrudes beyond the outer surface of the head element. In accordance with a preferred design the protective edge partially conceals the retainer and preferably only partially. It is recommended that the protective edge extend without interruption around the outer edge of the shroud. It is desirable that the protective edge leaves surfaces of the retainer, in which preferably controls for deforming the retainer are arranged, at least partially free or partially does not conceal them. In this way, a problem-free operation of the quick connector coupling is ensured.

Expediently the shroud on the end of the head element conceals the retainer preferably fully or essentially fully, when assembled. Within the scope of the invention, concealing refers to the fact that the shroud conceals the retainer preferably fully or essentially fully, in a top view of the shroud. The cross-section surface of the shroud on the side of the head is advantageously dimensioned in a way that the retainer is not visible for an observer who looks at the top view of the quick connector coupling (i.e., the male member entry port end). It is within the scope of the invention that the shroud includes an oval or approximately oval cross-section surface, whereby the entry port for the male member is arranged in the cross-section surface of the shroud at the male member entry port end of the head element.

It has also proven advantageous that the shroud on the end of the head element protects the retainer from mechanical damage.

In accordance with a design, the head element includes at least two guides, one each on opposite sides of each window that receives a locking lug between which the locking lug is positioned. It is especially preferred that each window for a retainer includes two such guides. The guides act as guide rails, for example, that provide that the retainer cannot be rotated relative to the head element or the connector body.

As an advantage, the locking lugs each include an insertion surface facing toward the entry port arranged diagonally to a center axis of the through bore, which during the insertion of the male member into the through bore, causes the locking lugs to be pressed radially outward by the radial upset on the male member. Expediently the male member for establishing the assembled condition is inserted into the quick connector body, which includes the retainer. During insertion, the radial upset of the male member is brought into contact with the insertion surfaces, so that the locking lugs are pushed away in radial direction outwardly from the central axis of the through bore. As soon as the radial upset of the male member is moved past the locking lugs, the locking lugs, which preferably are impacted by the spring force of the retainer, are pushed inward towards the center axis, so that the retention surface of the locking lugs are brought into contact with the radial annular contact surface of the radial upset of the male member. The locking lugs, in accordance with a design, are connected to the retainer ring in a way that the insertion surfaces of the locking lugs protrude into an interior space of the ring-shaped retainer.

In accordance with a design, the locking lugs includes a security element, which security element, in assembled condition, secures the locking lugs against a radial shifting away from the center axis of the through bore. Preferably every locking lug connected to the retainer includes a security element. Pressure in a fluid system, in which fluid system the quick connector coupling is integrated, pushes the male member toward the entry port in the shroud of the head element. As an advantage, the retainer is also pressed toward the entry port end of the through bore by the male member, by means of pressurization, for example through the fluid of the fluid system acting on the end of the male member. The security elements of the locking lugs advantageously interact with the connector body, especially the entry port in the shroud of the head element, and prevent the locking lugs from being pushed radially outward or away from the center axis of the connector body. It is especially preferred that the security element is formed as a security protrusion, whereby the security protrusion fits to cylindrical surface defining the entry port of the through bore at the head element shroud. The security protrusion, in accordance with a design, protrudes beyond a surface or end wall of the locking lugs and engages the cylindrical surface of the entry port in the shroud. The security protrusions of locking lugs engage the cylindrical surface of the shroud at the through bore and prevent the locking lugs from moving in radial direction from the center axis of the through bore. The limited axial movement of the retainer relative to the connector body, between the shroud of the head element and the radial flange of the sealing element permit shifting, or axial sliding of the retainer and locking lugs, sufficiently to disengage the security protrusions from the cylindrical surface of the entry port. The locking lugs may then be moved radially relative to the male member to permit disengagement of the male member and axial removal. The windows of the head element have sufficient axial length to permit such axial movement of the retainer.

Expediently the retainer includes at least one control, and preferably two diametrically opposed handle plates whereby the oval ring of the retainer, through an application of force, can be deformed in such a way that the locking lugs are movable in radial direction away from the center axis of the through bore. As an advantage, the control is shaped as a handle plate or pressure plate. It is especially preferable that the retainer includes two controls, which are arranged equally spaced between the diametrically opposed locking lugs on the retainer ring along the major axis of the oval retainer. When force is applied to the control or the controls, preferably in radial direction or in direction toward the center axis of the through bore, the oval retainer formed by the ring is deformed, preferably flattened, so that, especially preferred, the distance between the control and the center axis is reduced. The locking lugs connected to the ring or the locking lugs connected to the ring preferably are pushed radially outward or away from the center axis through the deformation of the ring, so that the male member is released. The retainer can be deformed in such a way that, due to the deformation of the retainer, the distance between the locking lugs and the male member is such that the radial upset can slide axially past the locking lugs out of the through bore at the entry port.

In the assembled condition of the head element, sealing element and retainer, the retainer is movable, in the axial direction in such a fashion that the security elements of the retainer can be detached, from the ring surface of the shroud of the head element, whereby a radial shifting of the locking lugs through application of force by the control only occurs such that the locking lugs or locking lugs release the radial upset of the male member. Preferably the retainer is movable away from the shroud in the direction toward the sealing element such that expediently, when so moved the retainer security element does not interact with the cylindrical surface defining the entry port at the shroud of the head element. The axial spacing between the radial flange of the sealing element and the shroud of the head element is such that the retainer is afforded such limited axial movement. Such movement is necessary to disengagement of the retention surface of the locking lugs from the radial contact surface of the upset of the male member when it is desired to remove the male member from the through bore.

It lies within the scope of the invention that the head element is locked in place with the sealing element. Expediently the head element contains locking elements that interact with complementary locking elements of the sealing element. For establishing the locking connection between the insertion portion of the head element and the insertion receptacle of the sealing element, the recommended cylindrical or essentially cylindrical section of the head element is inserted into the insertion receptacle through bore of the sealing element. The insertion portion of the head element, which is inserted into the sealing element, is preferably designed to carry the locking element or locking elements. Preferably the insertion receptacle of the sealing element, in assembled condition, includes at least one locking opening, in which locking opening a locking protrusion on the side of the head element takes hold, for securing the head element on the sealing element. It is especially preferable that a wall of the sealing element includes two locking openings, which locking openings are arranged preferably diametrically in the preferably cylindrical wall of the sealing element. It lies within the scope of the invention that every locking opening is assigned a locking protrusion on the side of the head element. By urging the locking protrusion or locking protrusions radially in the direction of the central axis of the through bore, it is possible, within the scope of the invention, to detach the head element from the sealing element and to remove it expediently from the through bore on the side of the sealing element.

In accordance with a design, the sealing element wall includes at least one guide on the side of the through bore, which guide interacts, with a complementary guide on the side of the head element to fixate the head element on the sealing element, preferably in anti-twist fashion. It is possible that the guide on the side of the sealing element is designed as a guide groove, in which guide groove a guide protrusion on the side of the head element takes hold. Preferably the sealing element includes at least two guides. In accordance with a design, the number of complementary guides on the side of the head element is equal to the number of complementary guides on the side of the sealing element.

In accordance with a design, the insertion receptacle of the sealing element includes four guide grooves and four locking openings and the insertion portion of the head element includes four guide protrusions and four locking protrusions such that the insertion portion may be secured in the insertion receptacle in four separate circumferential orientations, between the head element and sealing element of the connector body.

The invention is based on the realization that the inventive quick connector coupling is characterized by an advantageous compact construction or a compact design. The fact that, in the case of the inventive quick connector coupling, all elements are connected with each other and the retainer is permanently attached to the connector body, even in pre-assembled condition, guarantees easy assembly. The simple tool-free assembly comes in conjunction with high functional safety, since the inventive design of the retainer enables the easy detectability of a reliable and proper assembly of the quick connector coupling.

As a result, the inventive quick connector coupling is characterized by remarkable operability, for which no external parts need to be inserted into the quick connector coupling, while the connection is being established. Furthermore, the quick connector coupling is characterized by an improved guiding of the male member, which affects the stability and robustness of the inventive quick connector coupling in an advantageous manner.

DESCRIPTION OF THE DRAWINGS

The following is a closer description of the invention with the help of an illustration containing only one design example. In schematic illustration are shown.

DETAILED DESCRIPTION OF THE ILLUSTRATED EMBODIMENT

Figures 1, 2:
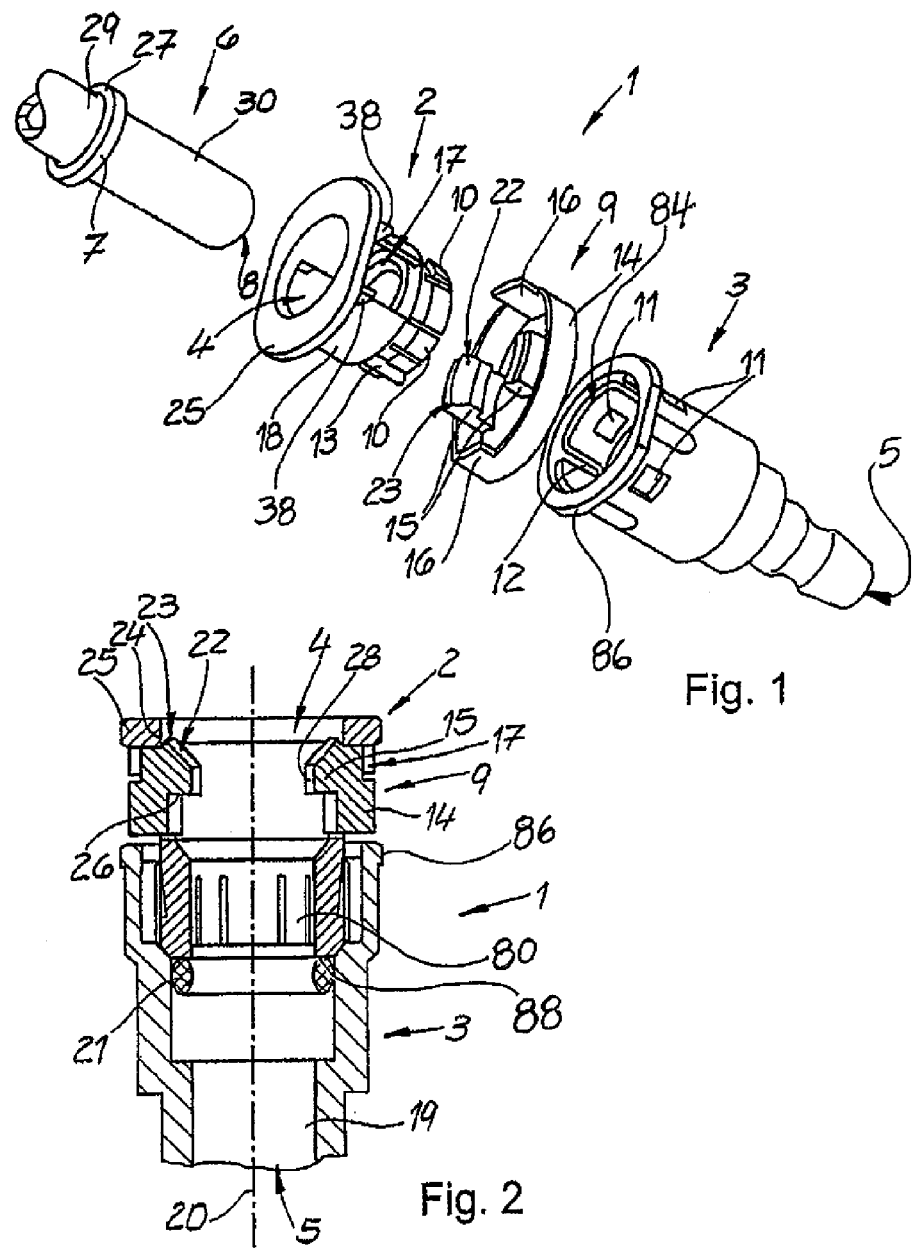
FIG. 1 an exploded diagram of an inventive quick connector coupling
FIG. 2 a cross-section through an inventive quick connector coupling in pre-assembled condition, FIG. 3 an inventive quick connector coupling in pre-assembled condition in accordance with FIG. 2, which has been rotated 90 degrees from FIG. 2, FIG. 4 a cross-section through an inventive quick connector coupling in pre-assembled condition, FIG. 5 a top view onto the inventive quick connector coupling in accordance with FIG. 4, FIG. 6 a top view in accordance with FIG. 5, for which a shroud of a head element has been removed to enable a clear view, FIG. 7 a perspective, partially broken view of an inventive quick connector coupling in accordance with FIG. 4 and FIG. 8 a top view in accordance with FIG. 4, whereby the ring of the retainer is compressed at the controls.

In FIG. 1 a quick connector coupling 1 is shown, which includes a generally cylindrical hollow body comprising a head element 2, which is connected to a sealing element 3. These elements define a through bore 19 along a longitudinal axis 20 illustrated in FIGS. 2 to 4. The head element 2 includes a male member entry port 4 at one end formed by cylindrical surface 24 in a shroud 25 at the end of head element 2. The opposite end comprises an insertion portion comprising an axially slotted wall 80. In accordance with FIG. 1 the sealing element 3 includes an exit port 5 at an end axially farthest away from the head element 2. As illustrated, the end of sealing element 3 defining the exit port 5 is configured to define a barbed hose connection aligned along longitudinal axis 20. As is common in quick connector configurations, the barbed hose connection end of the connector body could be disposed at some angle relative to the rest of the connector body, for example, at a ninety degree (90°) angle.

FIG. 1 shows that the head element 2, in accordance with a design example, includes four locking protrusions 10 at the insertion section, which is inserted into the sealing element 3, in the assembled condition of the quick connector coupling 1. In the assembled condition of the quick connector coupling 1 the locking protrusions 10 take hold in the corresponding locking openings 11 of the sealing element 3. As a result of the locking protrusions 10 taking hold in the corresponding locking openings 11 the head element 2 is fixated to the sealing element 3.

Preferably and in accordance with FIG. 1, the end of the sealing element 3 axially nearest the insertion portion of the head element 2 comprises an insertion receptacle 84 sized to axially receive and support the insertion portion slotted wall 80. The sealing element 3 includes a radial flange 86 surrounding the open end of the insertion receptacle 84.

The insertion receptacle 84 includes groove-shaped guides 12, in which, in assembled condition, complementary guides of the head element 2 in the shape of protrusions 13 take hold. In accordance with the design example the head element 2 is fixated to the sealing element 3, in anti-twist fashion. As illustrated, the insertion receptacle 84 includes four groove-shaped guides 12 and four locking openings 11 and the insertion portion of the head element 2 of the connector body includes four equally spaced protrusions 13 and four equally spaced locking protrusions 10. Thus, the rotational orientation of the head element 2 relative to the sealing element 3 may be indexed in ninety degree (90°) intervals. This is important in instances for example, when the stem end is formed at an angle, for example, a ninety degree (90°) angle to the remainder of the connector body along axis 20.

A male member or tube 6 can be inserted into the entry port 4, which male member 6 includes a ring-shaped radial upset 7. To make the insertion of the male member 6 through the entry port 4 into the head element 2 and the sealing element 3 easier, the end wall 8 of the male member 6 has the shape of a spherical shell section.

A cylindrical sealing surface 30 extends from the end 8 to the upset 7 and a cylindrical locking surface 29 extends along male member 6 on the opposite side of the radial upset 7.

In accordance with FIG. 1, the quick connector coupling 1 includes a retainer 9, which retainer 9 fully encircles the head element 2, in pre-assembled condition. As illustrated, the retainer 9 includes a ring 14, to which ring 14 two diametrically opposed locking lugs 15 and two diametrically opposed controls in the shape of handle plates 16 are connected, as inter alia shown in FIG. 1. The locking lugs 15 and the handle plates 16 are respectively arranged on the ring 14 in such a fashion that both locking lugs 15 or both handle plates 16 are respectively arranged diametrically on the ring 14. FIG. 1 shows that the locking lugs 15 are connected to the ring 14 on the inside of the ring or in direction of an interior space of the ring. Therefore, no contours protrude from the assembled surface of the ring 14 facing the observer, in accordance with the design example.

In pre-assembled condition, as shown in FIGS. 2 and 3, the head element 2 is interlocked with the sealing element 3 with the insertion portion of the head element disposed within and locked to the insertion receptacle 84 of the sealing element 3. Especially FIG. 3 shows that the retainer 9 or the ring 14 of the retainer 9 surrounds the head element 2. The head element 2 includes two windows 17, in accordance with the design example, through which the locking lugs 15 reach through a wall 18 of the head element 2 and extend into the a through bore 19 of the quick connector coupling 1. the windows 17 have an axial length somewhat longer than the axial length of the locking lugs 15 to permit limited axial translation of the retainer 9 and locking lugs 17.

Figure 6:
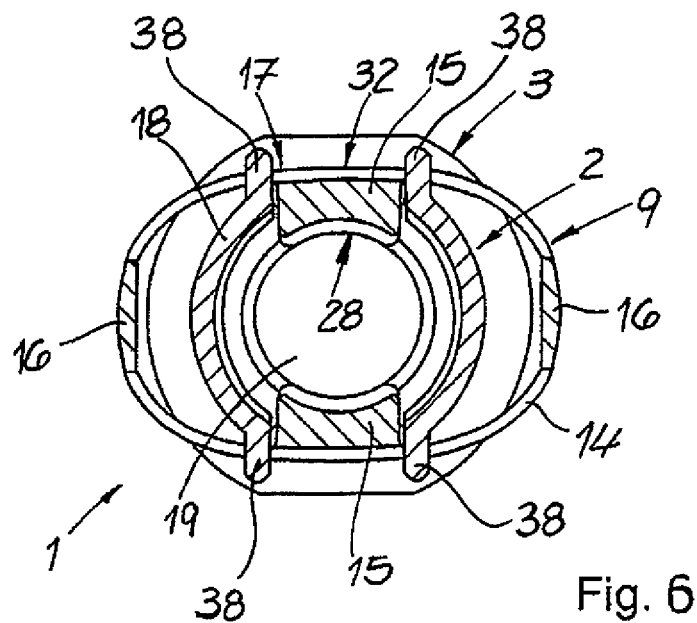
Figure 7:
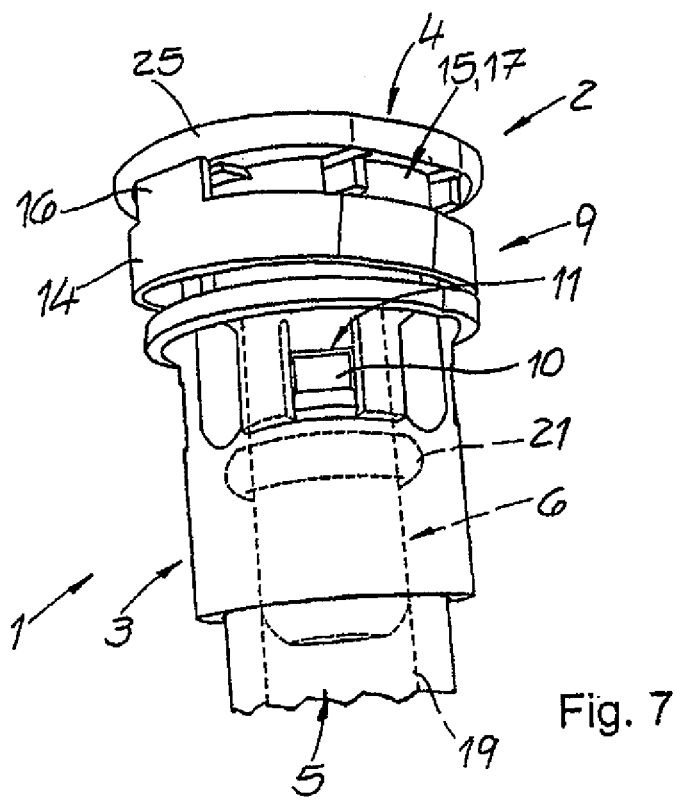
Figure 8:
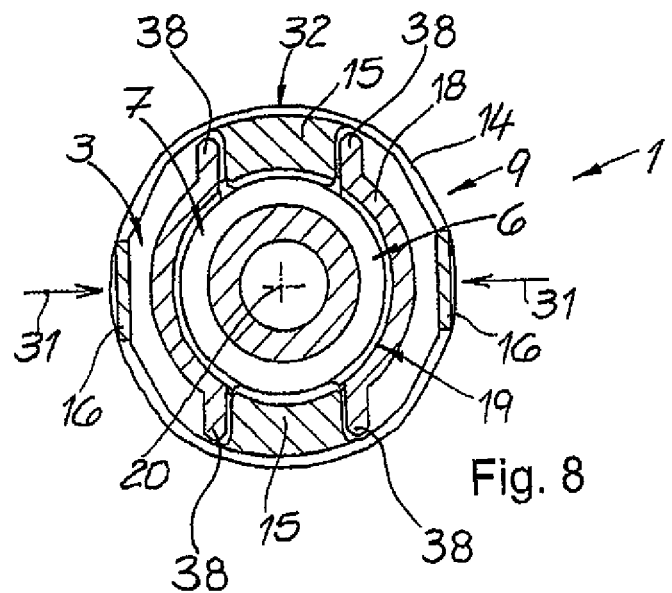

As best seen in FIGS. 6 to 8, the ring 14 is oval shaped having a diameter on its minor axis slightly larger than the outer surface of the head element 2. The ring 14 has a diameter on its major axis about a third larger than the diameter along the minor axis. As seen in FIG. 6, this relationship permits compressive deformation of the ring toward the extent of head element 2. As seen in FIG. 8, such compression at the controls 16 deform the ring 14 to a generally circular form. This action is sufficient to withdraw the locking lugs 15 from the through bore, but not from windows 17.

As best seen in FIGS. 6 to 8, the head element 2 includes radial guide walls 38 extending axially from shroud 25 along the defining opposite edges of windows 17. The guide walls 38 capture the locking lugs 15 against lateral translation and keep them aligned with windows 17 of head element 2 of the connector body.

In accordance with FIGS. 2 to 4 the sealing element 3 contains a seal member 21 designed as an O-ring, in accordance with design example. It is configured to provide a fluid tight seal between the through bore and the cylindrical sealing surface of the male member 6 as seen in FIG. 4. The radial annular end 88 of sealing element 3 restricts movement of seal member 21 axially toward the entry port 4 and provides a radial sealing surface for sealing contact by O-ring seal member 21.

FIG. 2 shows that each of the locking lugs 15 includes a insertion surface 22, exposed at the entry port 4 extending in a radial direction diagonally inward toward the central axis 20 and rearward toward the exit port 5 of the sealing element 3 of the through bore 19. The forward end of the insertion surface 22 nearest the entry port is designed as a security protrusion 23, respectively, in accordance with FIGS. 2 to 4. The security protrusions 23 are arranged to engage, in the assembled condition, cylindrical surface 24 of the head element 2 defining the entry port 4 of shroud 25, which forms an end wall of the head element 2, facing away from the sealing element 3. FIG.

5 shows that the shroud 25 is of such measurements that the retainer 9 is invisible to the observer from a top view of the quick connector coupling 1.

The axial spacing between the shroud 25 of head element 2 and the radial flange 86 of sealing element 4 is larger than the axial extent of the ring of retainer 9 thus permitting limited axial movement of the retainer 9 relative to the connector body. Such movement is limited by the axial length of the controls or handle plate 16 which abut the shroud 25.

The foregoing limited axial movement of retainer 9 is necessary to permit disengagement of the security protrusions 23 from cylindrical surface 24 of head element 2 in instances where it is desired to retract or withdraw the locking lugs 15 from the through bore through windows 17. Under conditions of a pressurized fluid in the fluid system, the upset 7 and consequently the locking lugs 15 are urged toward the entry port in shroud 25 causing the security protrusions 23 to engage cylindrical surface 24 of shroud 25 preventing radial outward extraction of locking legs 15.

In FIG. 4 the assembled condition of the quick connector coupling 1 is shown. The male member 6 with the radial upset 7 is fully inserted into the connector body formed by the head element 2 and the sealing element 3. When the male member 6 is inserted into the connector body, the radial upset 7 is brought into contact with the insertion surfaces 22, as a result of which, the locking lugs 15 of the retainer 9 are pushed apart in radial direction in relation to the through bore 19. The ring 14 of retainer 9 applies spring force to the locking lugs 15, through which spring force the locking lugs 15 are pushed in the direction of the central axis 20 of the through bore 19. As soon as the radial upset 7 of the male member 6 has slid past the locking lugs 15 the locking lugs 15 spring back into the position shown in FIGS. 2 to 4, due to the spring force. Retention surfaces 26 of the locking lugs 15 now fit to radial annular contact surface 27 of the radial upset 7, which prevents withdrawal of a male member 6 from the connector body. Simultaneously, the security protrusions 23 prevent an unintended deformation of the retainer 9 or pushing apart of the locking lugs 15 and also prevent an unintended detaching of the retainer 9.

Figure 5:
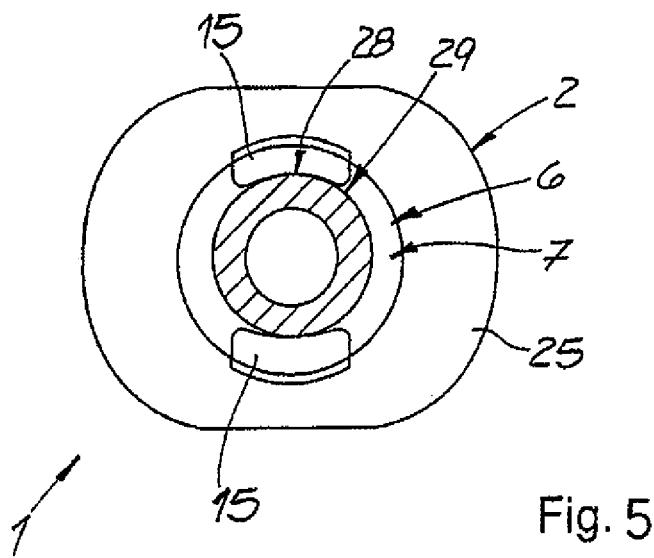

FIGS. 5 and 6 show that a contact surface 28 on the radially inner end of locking lugs 15 of the retainer 9 fit to cylindrical locking surface 29 of the male member 6 adjacent upset 7 on the side spaced from cylindrical sealing surface 30. The contact surface 28 on the end of each locking lug 15, in accordance with the design example, only fits to a circumferential segment of the cylindrical locking surface 29 of the male member 6.

FIG. 7 shows the quick connector coupling 1 in assembled condition, with a male member 6 inserted into the connector body. In assembled condition, cylindrical sealing surface 30 between end 8 and upset 7 of the male member 6 and the through bore in sealing element 3 fits to the sealing element 21, which is impermeable to fluids.

Referring to FIG. 4, it is seen that a portion of the cylindrical sealing surface 30 of male member 6 adjacent the end 8 is supported in closely spaced piloting relation within the through bore 19 in the sealing element portion 3. The cylindrical sealing surface 30 is also supported in closely spaced piloting relation within the cylindrical interior of slotted insertion portion 80 of the head element 2. Further, the cylindrical locking surface 29 of the male member 6 is radially supported by the arcuate contact surfaces 28 of each retainer locking lug 15 since the security protrusions 23 are captured by cylindrical surface 24 of head element 2. This relationship provides significant support of the male member 6 relative to the connector body to assure coaxial alignment along the axis 20. Thus the axial extent of axial insertion of the male member into the connector body is minimized to provide a compact connector body profile. For example, for typical tube (male member) sizes of 7.9 or 9.5 mm (millimeters) the axial insertion of the tube into the connector body may be reduced by two or more millimeters. That is, for example, the radial upset 7 may need only be inserted 5 to 7 mm. beyond the entry port 4 at shroud, 25.

FIG. 8 shows, based on FIG. 6, the deformation of the retainer 9. Through an application of force, as illustrated with arrows 31, towards the center axis 20 on retainer 9 the ring 14 is deformed in the surface of the handle plates 16. As a result, the sections 32, of ring 14 to which, preferably and in accordance with the design, the locking lugs 15 are connected are moved away from the through bore 19 in radial outward direction. In accordance with FIG. 8, the locking lugs 15 are moved away from the center axis 20 of the through bore 19 in such a way that the distance between the locking lugs 15 is the same or larger than the outer diameter of the ring-shaped radial upset 7. In detached condition, as shown in FIG. 8, it is possible to detach the male member 6 from the connector body, which is formed by the head element 2 and the sealing element 3. As soon as the force 31 ceases to act on the handle plates 16, the ring 14 of the retainer springs back into the configuration shown in FIGS. 1 to 7.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. Quick connector coupling for establishing a separable connection in a fluid line comprising:

a connector body defining a throughbore generally cylindrical about a central axis, to receive a tubular male member, said body comprising a head element having a wall defining a male member entry port at one end thereof and at least one window extending through said wall and communicating with said throughbore, spaced from said male member entry port, and a sealing element defining an exit port at one end thereof, wherein a portion of said head element is partly inserted into said sealing element, and secured thereto, a male member in said male member entry port having a radial outward upset spaced from an end thereof, a retainer cooperating with said upset releasably securing the male member to said connector body, said retainer having a ring fully encircling the connector body radially outward of said wall thereof, whereby the retainer includes at least one locking lug connected to said retainer ring at an end thereof, which locking lug extends through said at least one window in said wall of said connector body and includes a free end within said throughbore that interacts with said upset on said male member to releasably secure the male member to the connector body when said male member is fully inserted into said connector body.

2. Quick connector coupling in accordance with claim 1, wherein said wall of said head element of said connector body includes two windows therein extending through said wall and communicating with said throughbore spaced from said male member entry port and wherein the retainer includes two locking lugs, each extending through one of said windows, in said wall of said head element of said the connector body, to interact with the upset on said male member within said throughbore to releasably secure the male member to the connector body.

3. A quick connector coupling as claimed in claim 2, wherein said windows have an axial length along said wall of said of said head element longer than the axial length of said locking lugs extending through said windows to permit axial translation of said retainer relative to said connector body.

4. A quick connector coupling as claimed in claim 3, wherein said head element of said connector body includes a shroud extending radially outward at said male member entry port and said retainer ring is disposed between said shroud and said sealing element.

5. A quick connector coupling as claimed in claim 4, wherein said head element includes radial guide walls extending axially from said shroud along opposite edges of said windows, said guide walls capturing said locking lugs against lateral translation.

6. A quick connector coupling as claimed in claim 2, wherein said ring of said retainer is oval shaped and includes a major axis and a minor axis said retainer ring configured to have a diameter on its major axis larger than the diameter on its minor axis, and said locking lugs are disposed on said minor axis of said ring of said retainer spaced diametrically apart and wherein said diameter on its minor axis is larger than the outer surface of said head element.

7. A quick connector coupling as claimed in claim 6, wherein said shroud is sized to be larger than the said retainer at its minor diameter and concealing said retainer from said male member entry port.

8. A quick connector coupling as claimed in claim 7, wherein said ring of said retainer includes axial controls at said major axis extending toward said shroud of said head element, said controls limiting axial movement of said retainer relative to said head element toward said shroud.

9. A quick connector coupling as claimed in claim 2, wherein said locking lugs include an insertion surface diagonally of the longitudinal axis of said throughbore of said connector body, which on insertion of said end of said male member through said male member entry port causes radial outward movement of said locking lugs relative to said head element.

10. A quick connector coupling as claimed in claim 1, wherein said head element defines a cylindrical surface in said throughbore and said at least one locking lug includes a security protrusion, and wherein said security protrusion of said at least one locking lug engages said cylindrical surface of said through bore to preclude radial outward movement of said at least one locking lug.

11. A quick connector coupling as claimed in claim 2, wherein said head element defines a cylindrical surface in said through bore and said locking lugs each include a security protrusion, and wherein said security protrusion of each said locking lug engages said cylindrical surface of said throughbore to preclude radial outward movement of said locking lugs.

12. A quick connector coupling as claimed in claim 2, wherein said sealing element includes an open end defining an insertion receptacle and head element is interlocked with said sealing element in said insertion receptacle.

13. A quick connector coupling as claimed in claim 12, wherein said sealing element includes at least one locking opening and said head element includes at least one locking protrusion interlocked with said locking opening of said sealing element.

14. A quick connector coupling as claimed in claim 13, wherein said sealing element includes at least one groove shaped guide and said head element includes at least one protrusion slidably engaged in said groove shaped guide of said sealing element to fix said head element and sealing element against relative rotation.

15. A quick connector coupling as claimed in claim 4, wherein said sealing element includes an open end defining an insertion receptacle and wherein said sealing element includes at least one locking opening and said head element includes at least one locking protrusion interlocked with said locking opening of said sealing element,
said sealing element includes at least one groove shaped guide and said head element includes at least one protrusion slidably engaged in said groove shaped guide of said sealing element to fix said head element and sealing element against relative rotation, and
wherein said sealing element includes a radial flange surrounding the open end of said insertion receptacle and said retainer ring is disposed between said shroud of said head element and said radial flange of said sealing element.

16. A quick connector coupling is claimed in claim 6, wherein said tubular male member has a cylindrical surface adjacent said upset between said upset and said entry port, and said locking lugs are spring-mounted in a radial direction toward said central axis of said throughbore said locking lugs each including a retention surface and a contact surface disposed in said throughbore, with said retention surface in abutting relation to said radial upset and a contact surface contacting said cylindrical surface of said tubular male member.

17. A quick connector coupling as claimed in claim 16, wherein said oval shaped ring of said retainer is deformable by compression at said major axis to deform said ring to move said locking lugs radially outward to separate said contact surfaces from said cylindrical surface of said tubular male member and said retention surfaces from said abutting relation with said upset.

18. A quick connector as claimed in claim 17, wherein the diameter of said ring on its major axis is sufficiently long to permit compression at said major axis to move said locking lugs radially outward to separate said contact surfaces from said cylindrical surface of said tubular male member and said retention surfaces from said abutting relation with said upset.

19. A quick connector coupling as claimed in claim 18, wherein said head element defines a cylindrical surface in said throughbore and said locking lugs each include a security protrusion, and wherein said security protrusion of each said locking lug engages said cylindrical surface of said throughbore to preclude radial outward movement of said locking lugs.

* * * * *